J. L. GRAY.
STUFFING BOX.
APPLICATION FILED JULY 8, 1913.
1,097,127.
Patented May 19, 1914.
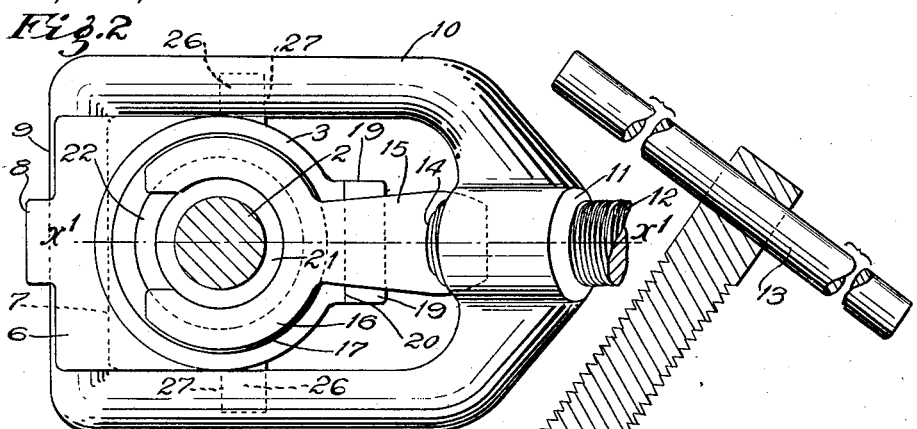
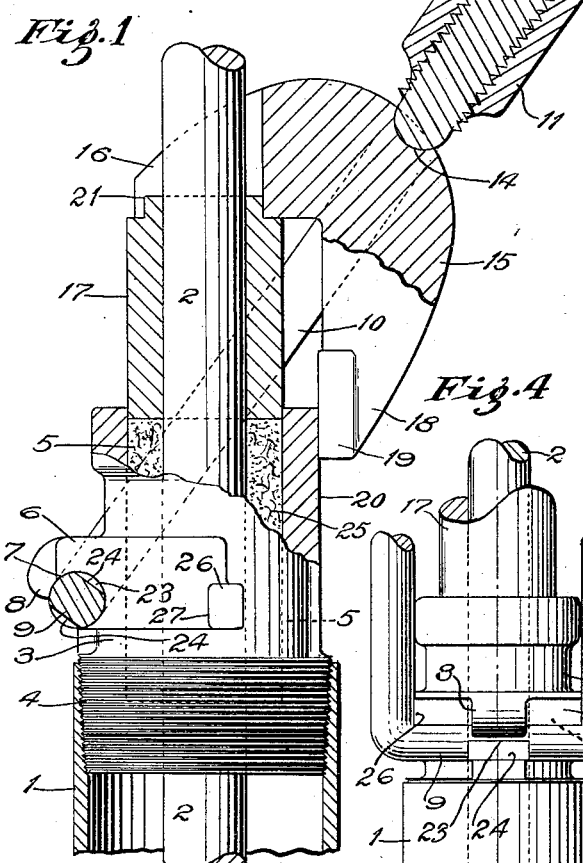
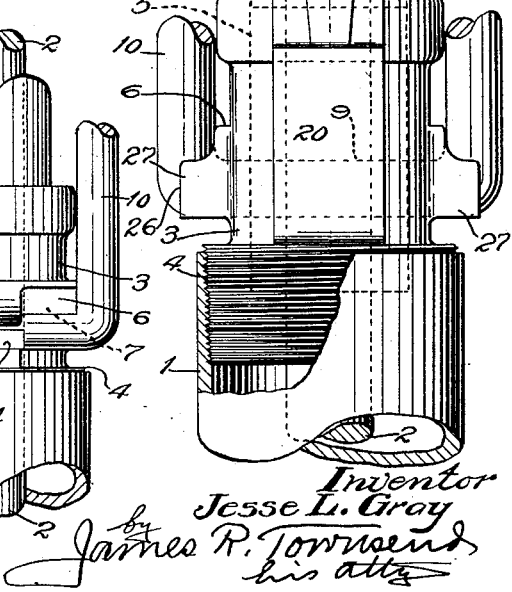
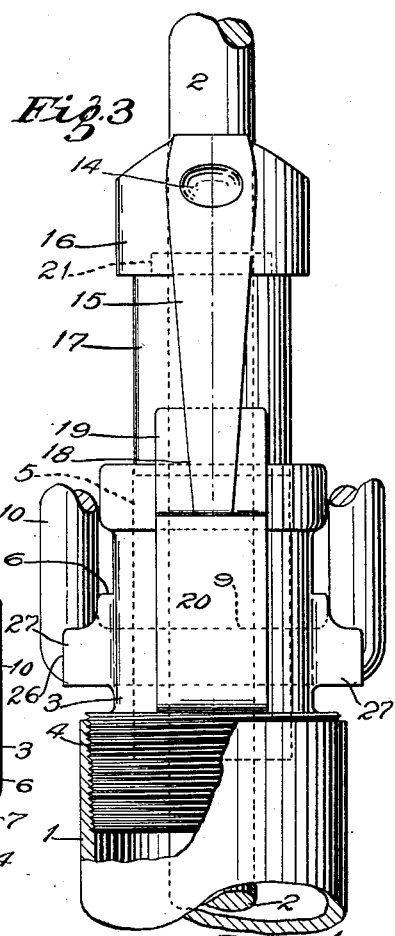
Witnesses
Thor Sjöberg
L. Belle Weaver
Inventor
Jesse L. Gray
by James R. Townsend
his atty
COLUMBIA PLANOGRAPH CO., WASHINGTON, D. C.

UNITED STATES PATENT OFFICE.

JESSE L. GRAY, OF LOS ANGELES, CALIFORNIA, ASSIGNOR OF ONE-FOURTH TO ROBERT W. GUNN AND ONE-FOURTH TO WILLSIE A. SCOTT THOMPSON, BOTH OF LOS ANGELES, CALIFORNIA.

STUFFING-BOX.

1,097,127.  Specification of Letters Patent.  Patented May 19, 1914.

Application filed July 8, 1913. Serial No. 777,968.

*To all whom it may concern:*

Be it known that I, JESSE L. GRAY, a citizen of the United States, residing at Los Angeles, in the county of Los Angeles and State of California, have invented a new and useful Stuffing-Box, of which the following is a specification.

This invention is applicable to various uses, but is more particularly designed for the stuffing boxes of polished rods of oil well pumps the packings of which have to be frequently renewed on account of the rough usage to which such stuffing boxes are put because of sand carried by the oil.

An object of the invention is to provide a stuffing box the gland of which can be removed and inserted into the stuffing box body with great ease and convenience, and it is understood that such glands can be made either of divided form or of integral form.

An object of the invention is to provide for forcing the gland home on the packing by easily manipulated means, and without cramping the polished rod.

The invention is regarded as broadly new and pioneer in that a follower is applied to the gland and is in slidable relation to the stuffing box body, and compression means in oblique operative relation to the stuffing box body and the follower are provided to force the follower toward the bottom of the stuffing box thus to compress the packing therein.

The invention may be carried out in various forms.

The accompanying drawings illustrate the invention.

Figure 1 is a fragmental elevation partly in section of a stuffing box constructed in accordance with this invention as it appears in operation. Line $x^1$, Fig. 2 indicates the plane of section. Fig. 2 is a fragmental plan of the parts shown in Fig. 1. Fig. 3 is a broken elevation from the right of Figs. 1 and 2, the compression screw and a portion of the link and its nut being omitted, and the top of the tubing being broken away. Fig. 4 is a reduced fragmental elevation from the left of Figs. 1 and 2.

The pump tubing 1 and polished rod 2 are of usual construction and the stuffing box body 3 is screw-threaded at its lower end and screwed into the tubing 1 in the usual way, and also has the usual packing chamber 5. It is, however, provided with a lug 6 having an under cut recess 7 that is preferably of circular form and extends over more than 180° so that its lip 8 will retain a cross-bar 9 of a link 10 that is provided at its upper end with a nut 11 to receive a compression screw 12 which has a suitable handle 13 and is screwed through the nut 11 and into a seat 14 in a follower 15 that has arms 16 to rest on the top of the gland 17, and also has a leg 18 with a slide 19 that move along a vertical way 20 formed on the stuffing box body opposite the recess 7 and lip 8.

The gland 17 has an annular boss 21 at its upper or outer end and the arms 16 embrace the same sufficiently to hold the follower in place when the compression screw is not applied to it.

The opening 22 between the ends of the arm 16 is of sufficient width to pass the polished rod 2, thus to allow the follower to be easily put into and removed from the position shown in Fig. 1 by first pressing horizontally onto the rod and then down vertically onto the gland.

The cross-bar 9 has a cut-away portion 23 formed by flattened faces 24, and which is narrow enough between said faces to be inserted into and caught in the recess 7 when the link is turned sufficiently far to the left in Fig. 1 to allow such insertion to take place, whereby the link pivotally engages the gland.

To assemble the stuffing box, the reduced portion 9 of the cross-bar will first be inserted in the recess while the link is turned down into position therefor on the side opposite its working position shown in Fig. 1, and while the stuffing box body is free from the polishing rod. Then the link will be swung across the body to bring its nut onto the side of the stuffing box body opposite the recess.

When the gland, the body and the link engaged therewith and extending obliquely thereacross have been applied to the polished rod, as indicated in Fig. 1, and before the follower 15 is applied, the gland 17 may be slid up the rod and the packing 25 inserted into the packing chamber 5 and hammered down into place by the gland 17 in the usual way. After the packing has been thus properly put into the chamber, the gland is brought into position, as shown in Fig. 1, and then the follower is applied being caught onto the gland by means of the arms 16 and boss 21, after which the link will be raised to bring the compression screw into alinement with the socket 14, and such screw working in the nut will be screwed home, thus operating as means held by the link and acting on the gland to force the gland toward the stuffing box body to compress and hold the packing in such chamber.

The socket 14 is so positioned on the follower 15 with relation to the recess 7 or lug 6 and the top of the gland 17 that when the packing chamber 5 is filled or nearly filled with packing 25 the force exerted by the screw 12 will, through the resolution of forces, move the follower in a path that is parallel with the axis of the polished rod 2 to seat the gland. When properly assembled the link extends obliquely across the body at an angle of about 45°, more or less, with the axis of the stuffing box body and the gland.

The body is provided with a link supporting shoulder 26 at one or both sides to hold the link and the compression screw from dropping down far enough to allow the reduced portion 9 to be withdrawn from the recess.

The projecting ribs 27 forming extensions of the lug 6 at the sides of the body reinforce the body against breakage from strain exerted by the screw.

It is thus seen that the compression means comprising the link 10 and screw 12 working in the nut 11 of the link is effective on the follower 15 resting on the gland 17 and running on the stuffing box body 3, to force the gland toward the bottom of the packing chamber and that this is done without cramping the polished rod or canting the gland thereon; and that the cross-bar of the link is side flattened as at 24 so that the cross-bar can pass the mouth of the recess in one position and is extended transversely of the link so that said cross-bar is non-withdrawable from the recess when the link extends in another position obliquely across said body.

I claim:—

1. The combination with a stuffing box body and a gland, of a follower resting on the gland and sliding on the body; a link held by the body and provided with a nut; and a screw in the nut to force the follower to seat the gland.

2. The combination with a stuffing box body and a gland; of a link engaging said body and extending obliquely thereacross; a follower resting on the gland and sliding on the body; and means held by the link, and acting on the follower to force the gland toward the body.

3. The combination with a stuffing box body and a gland, of a link pivotally engaging said body on one side and extending obliquely thereacross and provided with a nut; a follower resting on the gland and in slidable relation to the body; and a screw working in the nut and acting on the follower to move the gland toward the stuffing box body.

4. The combination with a gland, of a stuffing box body having a recess on one side; a link having a cross-bar caught in the recess, said link extending obliquely across the stuffing box body; a gland having a boss at its outer end; a follower resting on the gland and sliding on said body and embracing the boss; and compression means held by the link to move the follower and gland toward said body.

5. A stuffing box body having a lug on one side and a slideway on the other; a gland for such body; a follower caught on the gland and sliding on the slideway; a link held by the lug and extending obliquely across the body, and means held by the link and acting on the follower to force the gland toward the stuffing box body.

6. The combination with a rod, of a stuffing box body on the rod; packing in said body; a gland on the rod to compress the packing; said gland having an annular boss around the rod; a link in pivotal relation to the body and extending obliquely thereacross; a follower having arms to engage the boss, said arms being spaced to pass the rod; and means held by the link to move the follower and the gland.

7. The combination with a rod, of a stuffing box body on the rod; packing in said body; a gland on the rod to compress the packing; a link in pivotal relation to the body and extending obliquely thereacross; a follower having arms to engage the gland, said arms being spaced to pass the rod; and means held by the link to move the follower and the gland.

8. The combination with a stuffing box body and a gland, of a follower caught on the gland and slidable on said body and provided with a socket; a link in pivotal relation to the body, extending obliquely thereacross and provided with a nut, and a screw in the nut and seated in the socket.

9. In a stuffing box having a follower, a link and means held by the link to move the follower; a stuffing box body having a lip on one side to engage the link and being also provided with a shoulder to support the link when the same is not in use.

10. The combination with the stuffing box body provided on one side with a recess extending over 180°, of a link having a cross-bar flattened at the side to pass through the mouth of the recess when in one position and non-withdrawable through such mouth when extending in another position obliquely across the stuffing box body.

11. The combination with the stuffing box body provided on one side with a recess extending over 180°, of a link having a cross-bar flattened at the side to pass through the mouth of the recess when in one position and non-withdrawable through such mouth when extending in another position obliquely across the stuffing box body; said body being also provided with projections to hold the link from dropping sufficiently to allow removal of the cross-bar from the recess while the link is across the body.

12. In combination, a stuffing box body, a gland for said body, and a screw adapted to be swung in position to relatively move said body and gland and adapted to be swung out of such position to allow withdrawal of said gland.

In testimony whereof, I have hereunto set my hand at Los Angeles, California, this 2d day of July 1913.

JESSE L. GRAY.

In presence of—
JAMES R. TOWNSEND,
L. BELLE WEAVER.

---

Copies of this patent may be obtained for five cents each, by addressing the "Commissioner of Patents, Washington, D. C."